United States Patent
McAniff et al.

(10) Patent No.: US 7,672,953 B2
(45) Date of Patent: Mar. 2, 2010

(54) PUBLISHING WORK ACTIVITY INFORMATION KEY TAGS ASSOCIATED WITH SHARED DATABASES IN SOCIAL NETWORKS

(75) Inventors: Richard J. McAniff, Bellevue, WA (US); Anoop Gupta, Woodinville, WA (US); Bruce Johnson, Woodinville, WA (US); Mary P. Czerwinski, Woodinville, WA (US); Paul J. Hough, North Bend, WA (US); Pavel Curtis, Bellevue, WA (US); Roger S. Barga, Bellevue, WA (US); Raymond E. Ozzie, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 302 days.

(21) Appl. No.: 11/770,625

(22) Filed: Jun. 28, 2007

(65) Prior Publication Data

US 2009/0006415 A1  Jan. 1, 2009

(51) Int. Cl.
*G06F 17/30* (2006.01)
*G06F 17/00* (2006.01)
*G06F 15/167* (2006.01)
*G06F 15/177* (2006.01)
*G06F 3/00* (2006.01)

(52) U.S. Cl. .................. 707/10; 707/3; 707/8; 707/102; 707/104.1; 709/214; 715/734; 715/752

(58) Field of Classification Search ................ 707/1–3, 707/7, 10, 100, 102, 104.1, 200, 205; 715/203, 715/205, 230, 233, 253, 254, 703, 730, 733–734, 715/741, 744, 748, 751–753, 762–763, 743; 709/203, 218–225, 217, 231–232, 214–215; 703/1, 3, 8, 10, 102, 104.1
See application file for complete search history.

(56) References Cited

U.S. PATENT DOCUMENTS

| 6,999,962 | B2 * | 2/2006 | Julliard et al. ................. 707/10 |
| 7,234,117 | B2 | 6/2007 | Zaner et al. |
| 7,249,123 | B2 | 7/2007 | Elder et al. |
| 2002/0124053 | A1 * | 9/2002 | Adams et al. ............... 709/216 |
| 2004/0085354 | A1 * | 5/2004 | Massand ..................... 345/751 |
| 2005/0159970 | A1 * | 7/2005 | Buyukkokten et al. ......... 705/1 |
| 2005/0165891 | A1 * | 7/2005 | Moody et al. ............... 709/204 |

(Continued)

FOREIGN PATENT DOCUMENTS

WO  WO 2005/015470  * 2/2005

(Continued)

OTHER PUBLICATIONS

Natalie Glance et al. "Collaborative Document Monitoring", Group'01, Sep. 30-Oct. 3, 2001, Boulder, Colorado, USA, 8 pages.*

(Continued)

*Primary Examiner*—Srirama Channavajjala
(74) *Attorney, Agent, or Firm*—Lee & Hayes, PLLC (57) ABSTRACT

Communications, such as emails or other information, in a work setting can be retained in a shared database that operates similar to an Internet social network. As work activities are performed, the content of the work activities can be associated with one or more shared databases based on the individual performing the activities, a common topic or theme associated with the activity and/or a manual entry. As various individuals review information contained in the shared database, notifications relating to who reviewed the content and a time of review can be sent to a contributor of the content to provide for accountability issues.

19 Claims, 8 Drawing Sheets

U.S. PATENT DOCUMENTS

| | | |
|---|---|---|
| 2005/0171799 A1* | 8/2005 | Hull et al. ............... 705/1 |
| 2005/0198305 A1* | 9/2005 | Pezaris et al. ............ 709/227 |
| 2005/0210409 A1 | 9/2005 | Jou |
| 2006/0167737 A1* | 7/2006 | Muller et al. ............. 705/9 |
| 2006/0218153 A1 | 9/2006 | Voon et al. |
| 2006/0230061 A1 | 10/2006 | Sample et al. |
| 2006/0242581 A1 | 10/2006 | Manion et al. |
| 2007/0043688 A1* | 2/2007 | Kountz et al. ............. 707/1 |
| 2007/0157108 A1 | 7/2007 | Bishop |
| 2007/0174389 A1 | 7/2007 | Armstrong et al. |
| 2007/0192299 A1 | 8/2007 | Zuckerberg et al. |
| 2007/0255785 A1* | 11/2007 | Hayashi et al. ........... 709/204 |
| 2008/0005073 A1* | 1/2008 | Meek et al. ............... 707/3 |
| 2008/0040673 A1* | 2/2008 | Zuckerberg et al. ....... 715/745 |
| 2008/0086458 A1* | 4/2008 | Robinson et al. .......... 707/3 |

FOREIGN PATENT DOCUMENTS

| | | | |
|---|---|---|---|
| WO | WO 2007/081958 | * | 7/2007 |
| WO | WO 2008/141256 | * | 11/2008 |

OTHER PUBLICATIONS

Andy Adler et al. "Evaluating and implementing a collaborative office document system", Interacting with Computers 18 (2006) 665-682.*

U.S. Appl. No. 60/817,668.*

Peter Mika "Flink: Semantic Web technology for the extraction and analysis of social networks ",Web Semantics: Science, Services and Agents on the World Wide Web 3 (2005) 211-223.*

Danyel Fisher, et al. Activating the Social Workscape. Aug. 23, 2002. http://www.ics.uci.edu/~jpd/publications/2002/workscape-tr-02-2.pdf.

Steve Whittaker, et al. Why Email is not Enough: Combining Communication and Shared Representation to Support Activity Management. Sep. 20, 2005. http://www.daimi.au.dk/~bardram/ecscw2005/papers/whittaker.pdf.

John M. Carroll, et al. Frameworks for Sharing Teaching Practices. http://www.ifets.info/journals/8_3/15.pdf. Last accessed Aug. 31, 2007. pp. 162-175.

Francis Li, et al. Trailblazer Visualizing Community Activity with Contextual Metadata. Jun. 23, 2003. http://projects.interaction-ivrea.it/thesiscomm/paper/Francis-Li-report.pdf.

* cited by examiner

PUBLISHING WORK ACTIVITY INFORMATION KEY TAGS ASSOCIATED WITH SHARED DATABASES IN SOCIAL NETWORKS

BACKGROUND

Computing devices can be accessed at almost any time and any place and can contain a tremendous amount of information relating to people, organizations, general interests, etc. In fact, many people choose to share information about themselves with others, such as through a social network or through a journal. The social network information can include thoughts, interests, photos, and anything else someone wants to share.

Social networks provide a single-location repository of text, pictures, video, audio and other information that a user publishes on their individual social network website. A person viewing a particular social network website can post information, such as a message, a picture, or other data that the individual who controls the website, as well others who visit the website, can view. In addition, the individual that controls the website can restrict browsing by making it a personal website and only available to those selected to view the information. These social networks are rendering emails and similar information exchanges less common.

SUMMARY

The following presents a simplified summary in order to provide a basic understanding of some aspects of the disclosed examples. This summary is not an extensive overview and is intended to neither identify key or critical elements nor delineate the scope of such aspects. Its purpose is to present some concepts in a simplified form as a prelude to the more detailed description that is presented later.

In accordance with one or more examples and corresponding disclosure thereof, various aspects are described in connection with allowing aspects of actions traditionally performed with email to be executed in a social network concept, which allows the actions to be brought into an information worker space. Aspects can integrate typical email as well as other information (e.g., personal, work related, profile) to share and collaborate with others and allows a user or multiple users to publish such information to a select group of people. Thus, information in various forms (e.g., text, audio, visual) can be brought together as a cohesive unit. As new individuals are brought into the group, the published information is accessible from a common source or workspace instead of contained within separate, seemingly unrelated, emails or other documents. As items (e.g., photos, documents) are posted, the items can be automatically tagged and applied to a profile page associated with an individual, group, topic, project or other reference.

To the accomplishment of the foregoing and related ends, one or more examples comprise the features hereinafter fully described and particularly pointed out in the claims. The following description and the annexed drawings set forth in detail certain illustrative aspects and are indicative of but a few of the various ways in which the principles of the various aspects may be employed. Other advantages and novel features will become apparent from the following detailed description when considered in conjunction with the drawings and the disclosed examples are intended to include all such aspects and their equivalents.

DETAILED DESCRIPTION

Various aspects are now described with reference to the drawings. In the following description, for purposes of explanation, numerous specific details are set forth in order to provide a thorough understanding of one or more aspects. It may be evident, however, that the various aspects may be practiced without these specific details. In other instances, well-known structures and devices are shown in block diagram form in order to facilitate describing these aspects.

As used in this application, the terms "component", "module", "system", and the like are intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a server and the server can be a component. One or more components may reside within a process and/or thread of execution and a component may be localized on one computer and/or distributed between two or more computers.

Various aspects will be presented in terms of systems that may include a number of components, modules, and the like. It is to be understood and appreciated that the various systems may include additional components, modules, etc. and/or may not include all of the components, modules, etc. discussed in connection with the figures. A combination of these approaches may also be used. The various aspects disclosed herein can be performed on electrical devices including devices that utilize touch screen display technologies and/or mouse-and-keyboard type interfaces. Examples of such devices include computers (desktop and mobile), smart phones, personal digital assistants (PDAs), and other electronic devices both wired and wireless.

Figure 1:
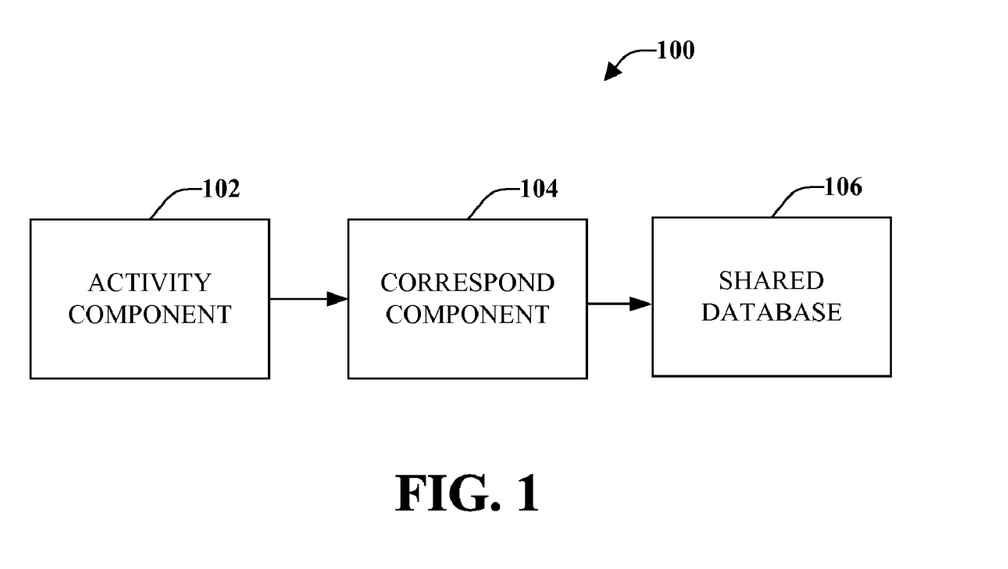
FIG. 1 illustrates an example system that facilitates publishing work activity to social networks.

Referring initially to FIG. 1, illustrated is an example system 100 that facilitates publishing work activity to social networks. Generally, people send out emails or other types of communications with links to data that is of concern to an individual or a group of individuals, such as in a team setting. However, if a new person joins the group or needs information contained in the previous communications, a search has to be performed to find the emails or other documents, which may or may not find the relevant information. System 100 can retain information relating to an individual, group, topic or other sources in a common area as a maintained setting, wherein relevant information can be found within a single point of reference.

System 100 includes an activity component 102 that can be configured to monitor one or more communications. Activity component 102 can receive various information relating to actions performed by one or more users and/or communications received and/or sent by users. Activity component 102 can monitor actions performed (e.g., communications or other actions) by an individual and selectively retain information deemed relevant for a particular reference. Such information can relate to business processes and workflows, for example. The information can be deemed relevant autonomously by system 100 and/or based on a manual entry from the user. Actions or other relevant data (e.g., items) can be communications between two or more people (e.g., email, instant message, phone calls, and so forth), reports, documents, and other information (e.g., personal, business related). While the various examples discussed herein relate to emails, the disclosed aspects can be utilized with other forms of communication, including, but not limited to, word processing documents, spreadsheets, files, presentations, web pages, messages, and so forth. Additionally, the related information can be in different formats, depending on how the information was created or captured (e.g., text, audio, video, photographs, and so on).

Interfaced with activity component 102 is a correspond component 104 that can be configured to label communications and/or other information with a key tag or other identifier that selectively associates the item with a topic or other reference. All entities on a system (e.g., computer system) such as emails, photos, files and so forth, have a multi-valued property. This property can be referred to as a tag and can identify the social networks to which the entity belongs. Since the entities are multi-valued, each entity can belong to zero or more (including multiple) social networks. For example, emails between two colleagues can be captured and, based on keywords, phrases, subject, individuals involved in the communication and/or a manual indication of a common topic, the emails can be associated with one or more topics or areas.

Each item relating to a topic can be maintained in a common workspace reserved for the topic. The workspace can be contained in one or more shared databases 106 that can be configured to maintain or provide access to the information upon request. In accordance with some aspects, the items are retained on individual devices and when a request is received to review a common workspace, the items are dynamically obtained from the disparate sources. In accordance with some aspects, an item might not relate to a common topic, and thus, is not associated with a common workspace.

In accordance with some aspects, system 100 can be configured to monitor actions performed on one or more tagged items and allow or deny such actions. For example, there might be select individuals or other entities that can obtain information from a common workspace. If a request to view the workspace is received from an individual not authorized to view the items, system 100 can deny entry to the items. In accordance with some aspects, the information can be viewed by anyone, but only authorized individuals can modify a document or other item contained in the common workspace. Attempted modifications by an unauthorized person can be denied and/or applied to a new document, not associated with the workspace. System 100 can also facilitate accountability issues by notifying a contributor of content when published items are read or viewed.

Thus, system 100 can provide dynamic publishing of various items relating to a common topic, wherein authorized viewers can obtain information relating to the topic from a common workspace. System 100 can maintain the integrity of the workspace content by allowing or denying modifications or other changes (e.g., moving files, posting information, deleting information and so forth) to information contained in the common workspace.

Figure 2:
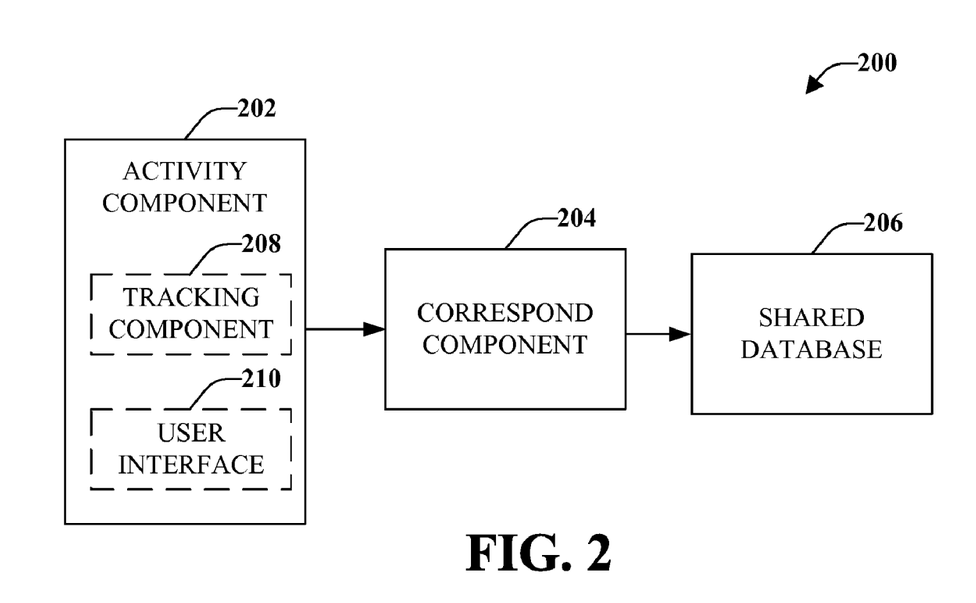
FIG. 2 illustrates an example system that automatically publishes work activity and, if appropriate, associates the work activity with related activities.

FIG. 2 illustrates an example system 200 that automatically publishes work activity and, if appropriate, associates the work activity with related activities. In an organization or in a personal sense, various activities can be related to each other and sharing similar information can increase productivity of individuals working on similar projects or other common goals. System 200 can review content within a workspace or content that is to be added to a workspace and make a determination whether the individual content or the content as a whole is related to one or more other workspaces. If there are similarities, system 200 can notify a user with information about the related workspace in an attempt to mitigate duplicate efforts and increase efficiency.

Included in system 200 is an activity component 202 that obtains information relating to one or more user activities. Such activities can include, but are not limited to, communications (both incoming and outgoing), documents, pictures, and other content (e.g., annotations, listings, and so forth) a user desires to associate with other items in a workspace. A correspond component 204 can be configured to review the obtained information and determine a shared database 206 to which the information might be associated, if any, and dynamically apply a cross-reference or other indicator to link the information with the shared database 206. In accordance with some aspects, a user can manually modify the cross-reference or other indicator automatically applied by system 200.

To facilitate obtaining data to be included in the shared database 206, activity component 202 can include a tracking component that can be configured to monitor activities of one or more users. Activities can include sent and/or received communications, generated documents, information specifically created to be applied to a shared database 206 (e.g., information posted directly into the shared database) and other actions. As information is received by tracking component 208, keywords, phrases, subject lines, individuals listed in an address section, and other parameters of the information can be sent to correspond component 204 that can analyze the information to determine if it relates to a particular project or topic.

Activity component 202 can include a user interface 210 through which a user can interact with system 200. In accordance with some aspects, user interface 210 can be a component separate from activity component 202. A user can interact with system to provide a manual linking between information and a shared database 206 to which the information should be applied. In accordance with some aspects, a feedback mechanism can be provided that allows a user to alter mapping rules that were used (e.g., by correspond component) to automatically apply the cross-reference or other indicator. The rules could be altered for a single item or for multiple items with similar keywords or attributes. The feedback mechanism can also allow for moving an item or multiple items to a different social network.

For example, an email can be received (or sent) and, after review of the email it is determined that the information should be posted or published to a shared database so that others can readily review the content of the email. The content might relate to standard operating procedures that would be useful for a person new to a company to readily access. Thus, as new people are hired, they can be directed to the shared database 206, rather than trying to locate and forward numerous emails to the new people.

In accordance with some aspects, an inclusion component 214 can be included in system 200 to allow manual tagging (e.g., manual assignment of a keyword, phrase, attribute, and so forth) of an item. Inclusion component 214 can allow tagging and entry of items into a shared database 206. The items added through inclusion component 214 can include arbitrary items (e.g., document, email, text message, phone call, spreadsheet, picture, voice file, image, and so on) that are considered useful additions to the shared database 206.

The user interface 210 can provide a graphical user interface (GUI), a command line interface, a speech interface, Natural Language text interface, and the like. For example, a GUI can be rendered that provides a user with a region or means to load, import, select, read, etc. information relating to a topic of a shared database 206. These regions can comprise known text and/or graphic regions comprising dialogue boxes, static controls, drop-down-menus, list boxes, pop-up menus, as edit controls, combo boxes, radio buttons, check boxes, push buttons, and graphic boxes. In addition, utilities to facilitate the information conveyance such as vertical and/or horizontal scroll bars for navigation and toolbar buttons to determine whether a region will be viewable can be employed.

The user can also interact with the regions to select and provide information through various devices such as a mouse, a roller ball, a keypad, a keyboard, a pen, gestures captured with a camera, and/or voice activation, for example. Typically, a mechanism such as a push button or the enter key on the keyboard can be employed subsequent to entering the information in order to initiate information conveyance. However, it is to be appreciated that the disclosed aspects are not so limited. For example, merely highlighting a check box can initiate information conveyance. In another example, a command line interface can be employed. For example, the command line interface can prompt the user for information by providing a text message, producing an audio tone, or the like. The user can then provide suitable information, such as alphanumeric input corresponding to an option provided in the interface prompt or an answer to a question posed in the prompt. It is to be appreciated that the command line interface can be employed in connection with a GUI and/or API. In addition, the command line interface can be employed in connection with hardware (e.g., video cards) and/or displays (e.g., black and white, and EGA) with limited graphic support, and/or low bandwidth communication channels.

Figure 3:
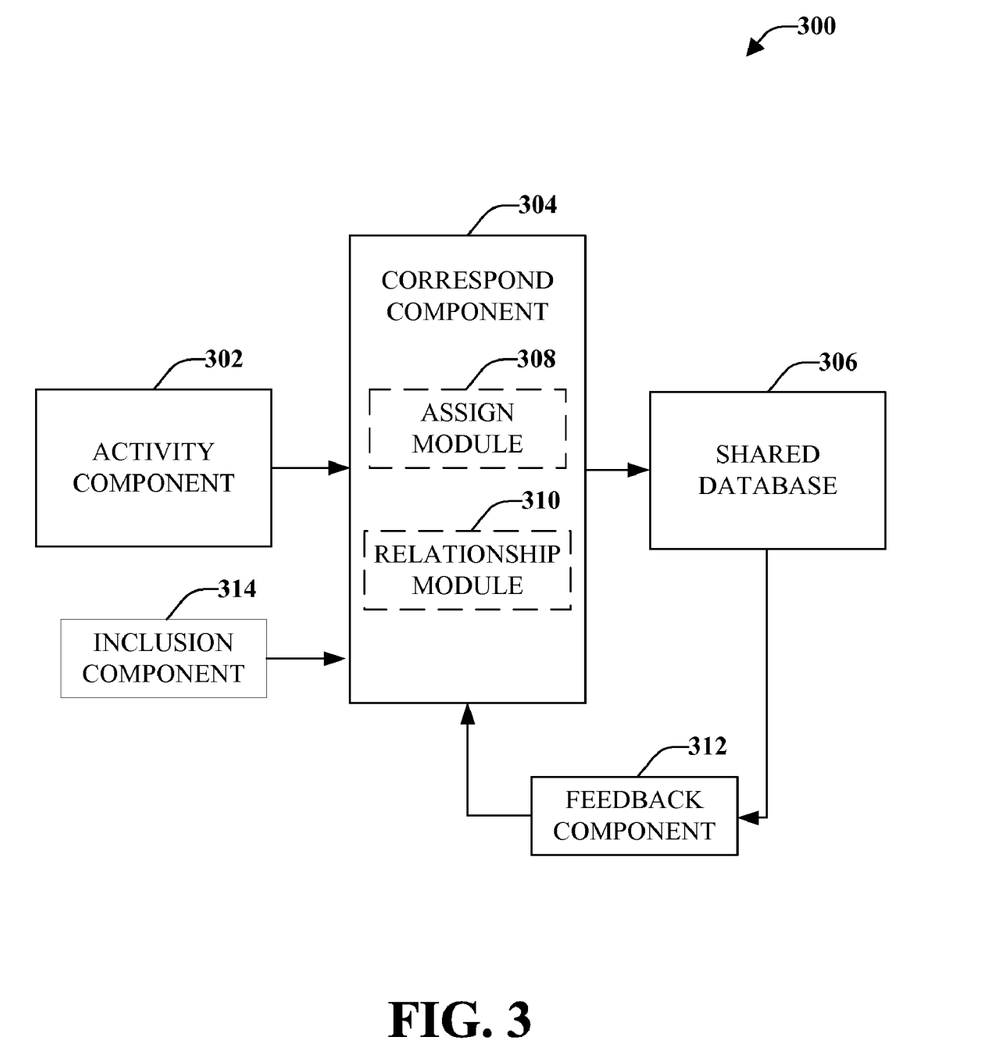
FIG. 3 illustrates an example system that can autonomously link information with one or more social networks that contain published work activity.

FIG. 3 illustrates an example system 300 that can autonomously link information with one or more social networks that contain published work activity. As individuals create, receive or become aware of information, there might be a desire to maintain related content in a common area so that others can review the content, as time permits. For example, individuals might generate information that they are willing to share with others in a business setting. Such information might include projects currently being worked on, interests or other information that other people might find useful.

System 300 is similar to the systems described with reference to the above figures and includes an activity component 302 that monitors and collects information and activities of one or more users. If the information and/or activities relate to a common topic and/or a social network retained in a shared database 306, a correspond component 304 can selectively associate the information and/or activities as belonging to one or more shared databases 306.

Correspond component 304 can include an assign module 308 that can be configured to provide a reference or other indicator to an item (e.g., document, communication, picture and so forth). The reference can designate that the item is associated with one or more shared databases 306. Also included in correspond component 304 can be a relationship module 310 that can be configured to associate two or more shared databases 306. For example, an email can relate to one or more work groups, projects or other activities in which similar or different individuals might be involved. Rather than posting the information to each database 306, resources can be conserved by retaining the item in a single format and providing two or more different references to the item. When a shared database 306 is reviewed, the item can be dynamically output with reference to that database 306. In accordance with some aspects, an item is posted directly into the shared database 306, rather than being a separate component.

In accordance with some aspects, a feedback component 312 can be included in system 300 to provide manual configuration or modification to one or more items included in the shared database 306. Feedback component 312 can be configured to receive a manual request to move an item from a first shared database to a second shared database. Feedback component 312 can also be configured to accept a manual modification to mapping rules that were used to automatically assign an item to a particular database. The mapping rules can be changed for a single item (e.g., one time only) or across multiple items (e.g., items with similar key words, phrases, attributes, and so forth).

Shared database 306 might be a repository and/or some other medium that can store information. By way of example, and not limitation, the shared database 306 can include nonvolatile and/or volatile memory. Suitable nonvolatile memory can include read only memory (ROM), programmable ROM (PROM), electrically programmable ROM (EPROM), electrically erasable programmable ROM (EEPROM), or flash memory. Volatile memory can include random access memory (RAM), which acts as external cache memory. By way of example and not limitation, RAM is available in many forms such as static RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), Rambus direct RAM (RDRAM), direct Rambus dynamic RAM (DRDRAM), and Rambus dynamic RAM (RDRAM).

Figure 4:
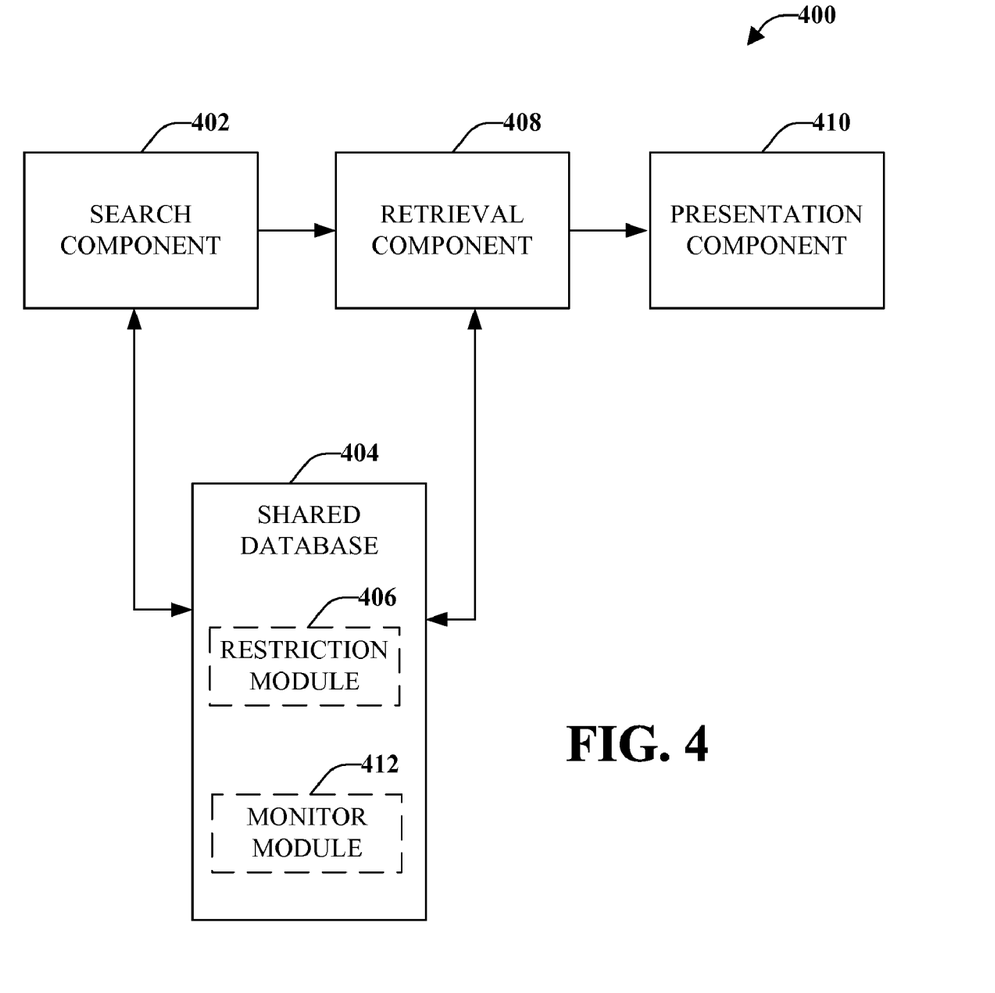
FIG. 4 illustrates an example system that selectively retrieves information or applies modifications to information contained in a common repository.

Referring now to FIG. 4, illustrated is an example system 400 that selectively retrieves information or applies modifications to information contained in a common repository. Various information relating to an individual, a group, a task, a project or other data can be published to a repository that can function similar to an Internet social network. An individual, whether or not associated with content contained in the repository, might desire to view the content. System 400 can facilitate review of content by authorized individuals and can selectively allow modifications to the information.

System 400 includes a search component 402 that can be configured to receive a request for information that might be contained in a repository or other media. The request can include a specific reference to the repository or might include keywords or other search terms. Based on the input information, search component can access one or more databases 404 that can be configured to maintain or provide links to various content.

In order to maintain integrity of content, a shared database 406 can include a restriction module 406 that can selectively allow or deny review and/or modification of content maintained in a shared database 404. For example, the shared database might retain personnel information that should be available to only individuals of a Human Resource Department. Restriction module 406 can deny access to the database 404 from individuals not employed within the department. Thus, unauthorized access to sensitive information can be maintained.

If a person is authorized to view content, a retrieve module 406 can selectively obtain information included in or associated (e.g., based on an indicator or key tag) with database 404. The information can be output by a presentation component 410. The output information can be visually displayed or presented in another manner (e.g., audibly or through another perceivable means).

In accordance with some aspects, there might not be restrictions on individuals viewing a database. For example, various people might post personal information to a social network in a business setting. A CEO might post interesting articles, documents, books, websites that relate to the business or that might be of interest to those working in the business. As such, people within the company can view the social network of this individual, which might not be related to any particular topic, to gain more insight into the business.

As individuals view information contained in a shared database 404, there might be a desire to post additional content, change content and so forth. Such changes can be accepted or denied based on authorizations contained in restriction module 406.

A monitor module 412 can be configured to monitor whether an individual has reviewed content contained in a shared database 404. With emails there can be accountability associated with when a person sent an email, when a recipient opened an email and so forth (e.g., if an email was deleted). Monitor module 412 can selectively provide accountability relating to certain items posted or associated with a shared database 404. As a person views information in the shared database 404, there can be an accountability based on actions performed (e.g., viewed database at a particular time, opened various content, paused on various content, and so on). Monitor module 412 can observe the actions of the individual and might provide information relating to such actions. In accordance with some aspects, monitor module 412 can automatically provide a notification to an individual that posted particular content when the content is read or other actions are performed relating to the content.

Figure 5:
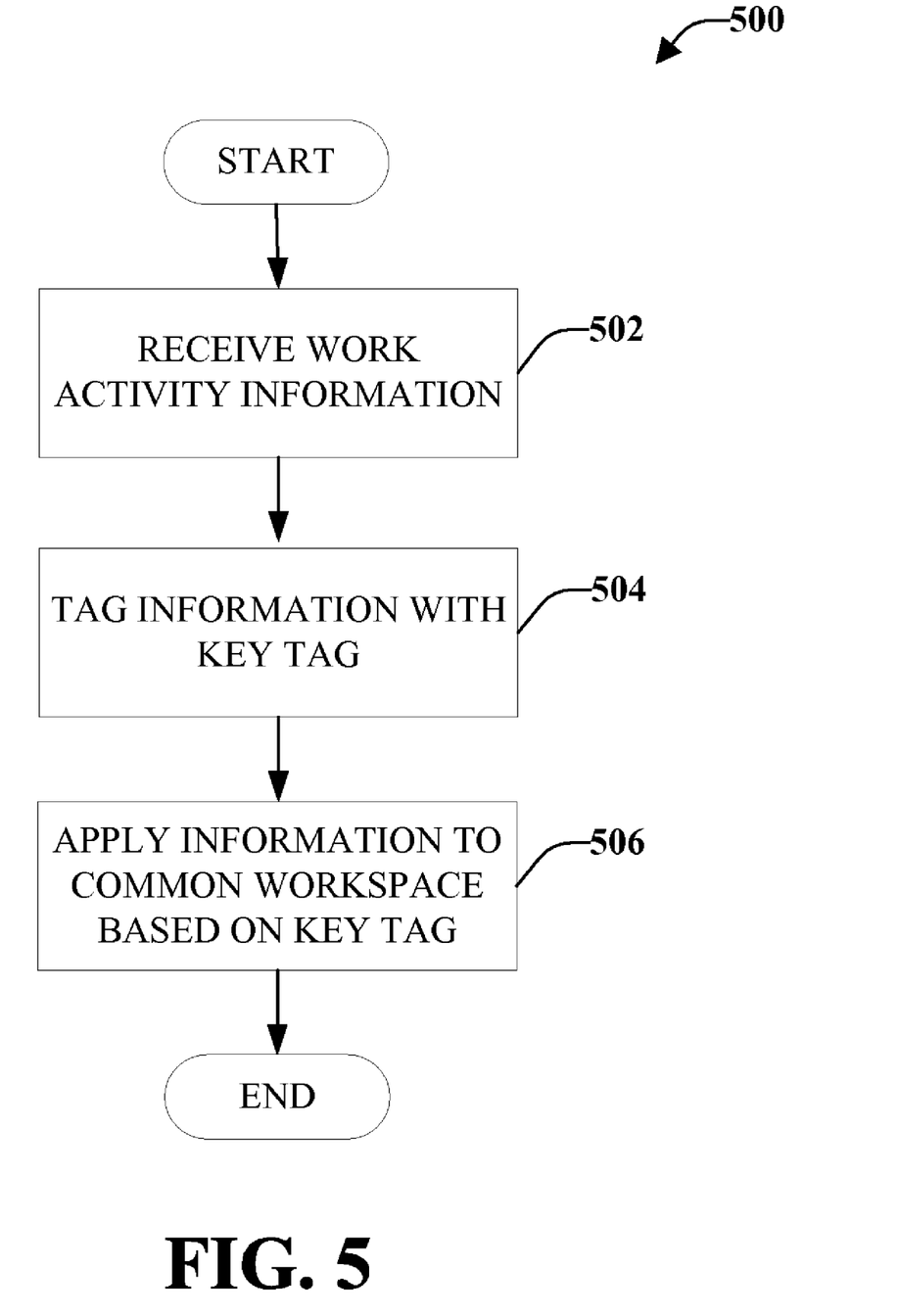
FIG. 5 illustrates a method for publishing work activity in a social network environment.
Figure 6:
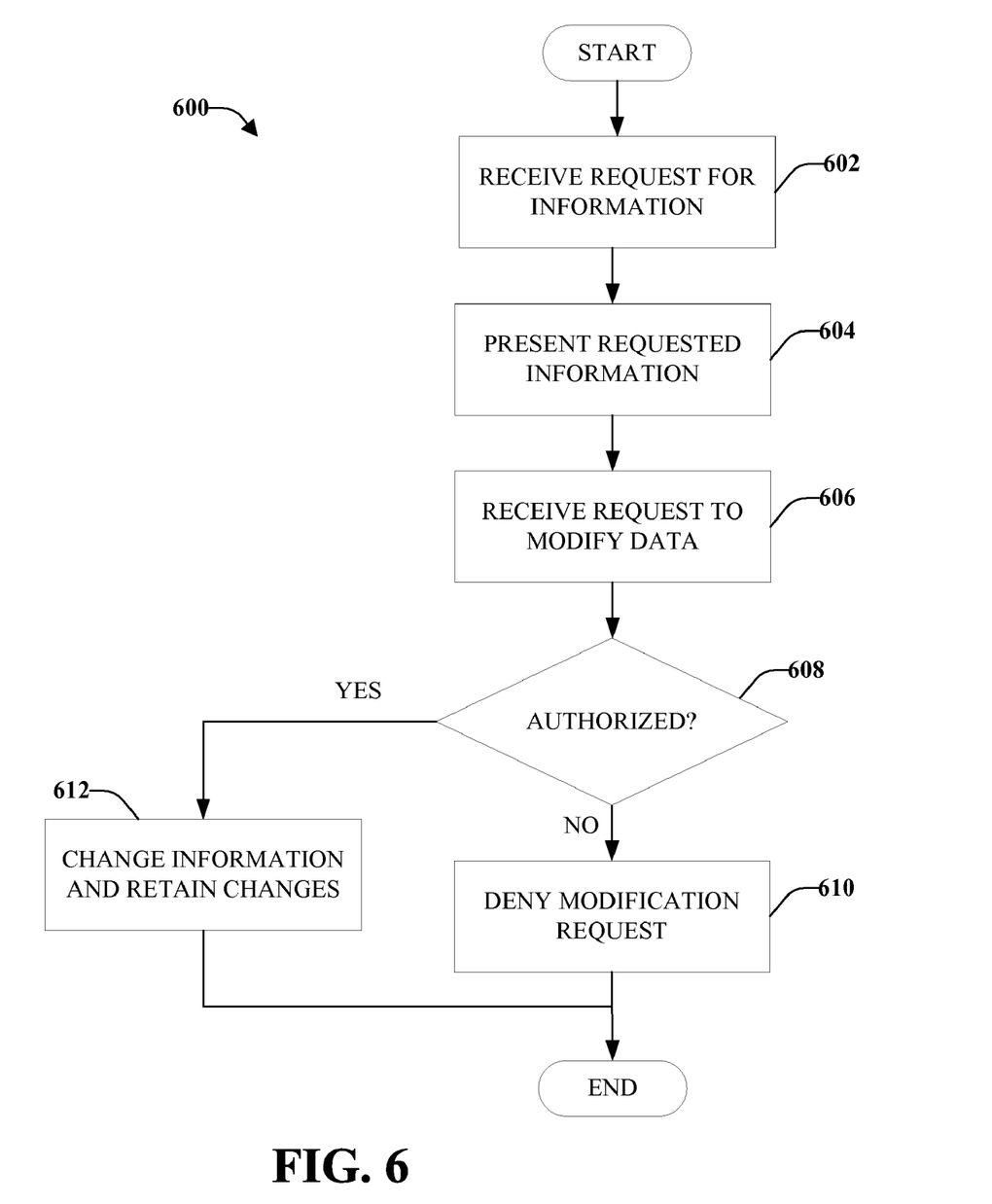
FIG. 6 illustrates a method for selectively allowing modifications to published content in a shared database.

In view of the exemplary systems shown and described above, methodologies that may be implemented in accordance with the disclosed subject matter, will be better appreciated with reference to the flow charts of FIGS. 5 and 6. While, for purposes of simplicity of explanation, the methodologies are shown and described as a series of blocks, it is to be understood and appreciated that the disclosed aspects are not limited by the number or order of blocks, as some blocks may occur in different orders and/or concurrently with other blocks from what is depicted and described herein. Moreover, not all illustrated blocks may be required to implement the methodologies described hereinafter. It is to be appreciated that the functionality associated with the blocks may be implemented by software, hardware, a combination thereof or any other suitable means (e.g. device, system, process, component). Additionally, it should be further appreciated that the methodologies disclosed hereinafter and throughout this specification are capable of being stored on an article of manufacture to facilitate transporting and transferring such methodologies to various devices. Those skilled in the art will understand and appreciate that a methodology could alternatively be represented as a series of interrelated states or events, such as in a state diagram.

FIG. 5 illustrates a method 500 for publishing work activity in a social network environment. Method 500 can facilitate tracking and retention of various communications and other information relating to a common theme (e.g., project, team, person, and so forth). The retained information can be distributed to a group of selected individuals or publicly to anyone that desires to view the information. For example, when a link, such as to a URL, is contained in an email message, the link to the email might be lost and not able to be found at a later time. In some situations, emails can be sent to an entire staff of people, however, a shared database where the relevant information can be posed would be easier and more efficient for both sender and recipient. Thus, when there is a new hire the shared database can be a place that the new person can be referred to in order to obtain relevant information.

Method 500 starts, at 502, with receipt of work activity information. The receipt can be triggered by an incoming communication, creation of a document, a manual entry indicating that a document is related to a particular work activity (e.g., research performed) and so forth. At 504, the information is assigned an indicator or key tag that associates the incoming communication or other information with a common topic. In accordance with some aspects, the information can be associated with two or more common topics (e.g., a personal information tag and a tag associated with a team). The information is applied, at 506, to a common workspace (e.g., social network) based on the key tag. As individuals are authorized and desire to view the content of the common workspace, the various items within the workspace can be presented and/or modifications can be made.

FIG. 6 illustrates a method 600 for selectively allowing modifications to published content in a shared database. Within an organization, numerous individuals might be involved on a single project or team effort. The information relating to the project can be created by a person associated with the project and maintained in a shared database. However, there might be individuals within the organization that are interested in the project or might have a related project and desire to view the status or other information relating to the topic. Method 600 can allow presentation of the published material to individuals, including individuals not associated with the project, while mitigating modifications that might jeopardize the project or cause other problems.

A request for information relating to published information contained in a shared database is received, at 602. The request might be from individuals working on the common topic or others interested in obtaining information about the topic. The requested information can be selectively presented, at 604. For example, viewing of the shared directory might be limited to selected individuals or it might be available to anyone that has access to the directory (e.g., employees of an organization). A list of users allowed to view or modify the work activity information can be maintained within the shared database or accessible by the shared database. The published information might be retrieved from two or more devices that maintain different portions of the information.

At 606, a request to modify, add, delete, etc. data within the shared database is received. Based on the received request and the individual making the request, a determination is made, at 608, whether the request was received from an authorized individual. When the shared database is established, or at any time, modifications to data contained in the database can be limited to certain individuals who can be predefined as authorized. Such limitations can assist in maintaining database integrity by limiting the number of individuals that can manipulate the data.

If the person is not authorized ("NO"), the modification request is denied, at 610. A message can be sent to the individual indicating that modifications will not be maintained in the shared database (e.g., will be automatically deleted, can be maintained in another location, and so forth). If the determination, at 608 is that the individual is authorized ("YES"), the modifications are applied to the information and retained in the shared database, at 612. Subsequent requests to view the information can be presented with the modified data. In accordance with some aspects, individuals can be automatically notified of any changes or additions to the data. Such individuals can be identified based on an explicit request for the information or based on other criteria (e.g., author of a document, member of a group, and so forth).

It will be appreciated that, in accordance with one or more aspects described herein, inferences can be made regarding which tag to apply to a communication, determining whether a communication should be applied to a common workspace, cross-referencing workspaces, and so forth. As used herein, the term to "infer" or "inference" refers generally to the process of reasoning about or inferring states of the system, environment, and/or user from a set of observations as captured through events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources. Artificial intelligence based systems (e.g., explicitly and/or implicitly trained classifiers), rules-based logic systems or other machine learning techniques can be employed in connection with performing inference and/or probabilistic determinations and/or statistical-based determinations as in accordance with one or more of the disclosed aspects.

According to an example, one or more aspects presented above can include making inferences pertaining to assigning an indicator to a communication for association with a common topic. In accordance with another example, an inference can be made related to alerting individuals when various content is posted to a shared database. According to a further example, an inference can be made pertaining to a likelihood that a shared database is related to information contained in another database It will be appreciated that the foregoing examples are illustrative in nature and are not intended to limit the number of inferences that can be made or the manner in which such inferences are made in conjunction with the various aspects described herein.

Figure 7:
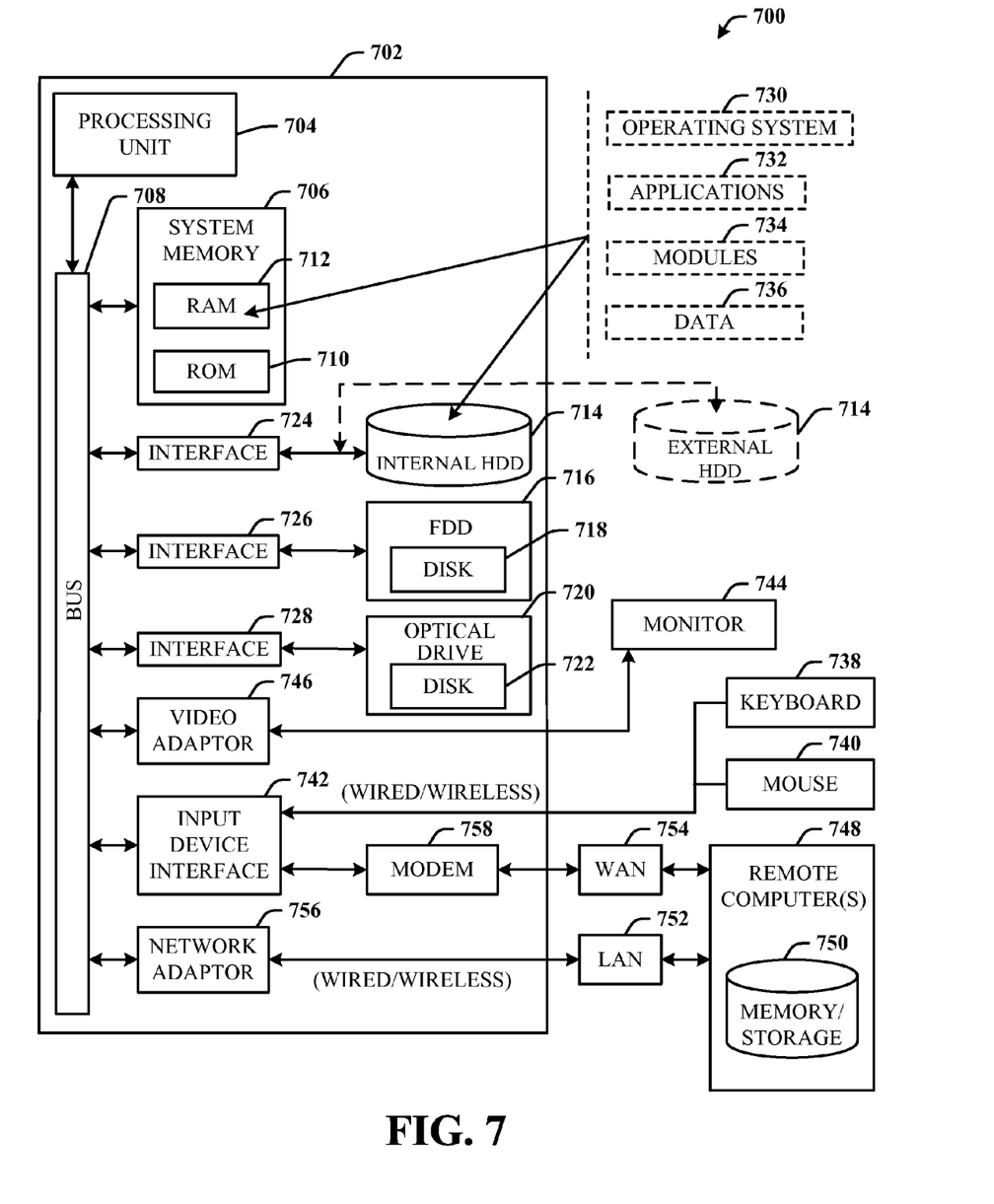
FIG. 7 illustrates a block diagram of a computer operable to execute the disclosed aspects.

Referring now to FIG. 7, there is illustrated a block diagram of a computer operable to execute the disclosed architecture. In order to provide additional context for various aspects disclosed herein, FIG. 7 and the following discussion are intended to provide a brief, general description of a suitable computing environment 700 in which the various aspects can be implemented. While the one or more aspects have been described above in the general context of computer-executable instructions that may run on one or more computers, those skilled in the art will recognize that the various aspects also can be implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The illustrated aspects may also be practiced in distributed computing environments where certain tasks are performed by remote processing devices that are linked through a communications network. In a distributed computing environment, program modules can be located in both local and remote memory storage devices.

A computer typically includes a variety of computer readable media. Computer readable media can be any available media that can be accessed by the computer and includes both volatile and nonvolatile media, removable and non-removable media. By way of example, and not limitation, computer-readable media can comprise computer storage media. Computer storage media includes both volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD ROM, digital video disk (DVD) or other optical disk storage, magnetic cassettes, magnetic tape, magnetic disk storage or other magnetic storage devices, or any other medium which can be used to store the desired information and which can be accessed by the computer.

With reference again to FIG. 7, the exemplary environment 700 for implementing various aspects includes a computer 702, the computer 702 including a processing unit 704, a system memory 706 and a system bus 708. The system bus 708 couples system components including, but not limited to, the system memory 706 to the processing unit 704. The processing unit 704 can be any of various commercially available processors. Dual microprocessors and other multi-processor architectures may also be employed as the processing unit 704.

The system bus 708 can be any of several types of bus structure that may further interconnect to a memory bus (with or without a memory controller), a peripheral bus, and a local bus using any of a variety of commercially available bus architectures. The system memory 706 includes read-only memory (ROM) 710 and random access memory (RAM) 712. A basic input/output system (BIOS) is stored in a non-volatile memory 710 such as ROM, EPROM, EEPROM, which BIOS contains the basic routines that help to transfer information between elements within the computer 702, such as during start-up. The RAM 712 can also include a high-speed RAM such as static RAM for caching data.

The computer 702 further includes an internal hard disk drive (HDD) 714 (e.g., EIDE, SATA), which internal hard disk drive 714 may also be configured for external use in a suitable chassis (not shown), a magnetic floppy disk drive (FDD) 716, (e.g., to read from or write to a removable diskette 718) and an optical disk drive 720, (e.g., reading a CD-ROM disk 722 or, to read from or write to other high capacity optical media such as the DVD). The hard disk drive 714, magnetic disk drive 716 and optical disk drive 720 can be connected to the system bus 708 by a hard disk drive interface 724, a magnetic disk drive interface 726 and an optical drive interface 728, respectively. The interface 724 for external drive implementations includes at least one or both of Universal Serial Bus (USB) and IEEE 1394 interface technologies. Other external drive connection technologies are within contemplation of the one or more aspects.

The drives and their associated computer-readable media provide nonvolatile storage of data, data structures, computer-executable instructions, and so forth. For the computer 702, the drives and media accommodate the storage of any data in a suitable digital format. Although the description of computer-readable media above refers to a HDD, a removable magnetic diskette, and a removable optical media such as a CD or DVD, it should be appreciated by those skilled in the art that other types of media which are readable by a computer, such as zip drives, magnetic cassettes, flash memory cards, cartridges, and the like, may also be used in the exemplary operating environment, and further, that any such media may contain computer-executable instructions for performing the methods disclosed herein.

A number of program modules can be stored in the drives and RAM 712, including an operating system 730, one or more application programs 732, other program modules 734 and program data 736. All or portions of the operating system, applications, modules, and/or data can also be cached in the RAM 712. It is appreciated that the various aspects can be implemented with various commercially available operating systems or combinations of operating systems.

A user can enter commands and information into the computer 702 through one or more wired/wireless input devices, e.g., a keyboard 738 and a pointing device, such as a mouse 740. Other input devices (not shown) may include a microphone, an IR remote control, a joystick, a game pad, a stylus pen, touch screen, or the like. These and other input devices are often connected to the processing unit 704 through an input device interface 742 that is coupled to the system bus 708, but can be connected by other interfaces, such as a parallel port, an IEEE 1394 serial port, a game port, a USB port, an IR interface, etc.

A monitor 744 or other type of display device is also connected to the system bus 708 through an interface, such as a video adapter 746. In addition to the monitor 744, a computer typically includes other peripheral output devices (not shown), such as speakers, printers, etc.

The computer 702 may operate in a networked environment using logical connections through wired and/or wireless communications to one or more remote computers, such as a remote computer(s) 748. The remote computer(s) 748 can be a workstation, a server computer, a router, a personal computer, portable computer, microprocessor-based entertainment appliance, a peer device or other common network node, and typically includes many or all of the elements described relative to the computer 702, although, for purposes of brevity, only a memory/storage device 750 is illustrated. The logical connections depicted include wired/wireless connectivity to a local area network (LAN) 752 and/or larger networks, e.g., a wide area network (WAN) 754. Such LAN and WAN networking environments are commonplace in offices and companies, and facilitate enterprise-wide computer networks, such as intranets, all of which may connect to a global communications network, e.g., the Internet.

When used in a LAN networking environment, the computer 702 is connected to the local network 752 through a wired and/or wireless communication network interface or adapter 756. The adaptor 756 may facilitate wired or wireless communication to the LAN 752, which may also include a wireless access point disposed thereon for communicating with the wireless adaptor 756.

When used in a WAN networking environment, the computer 702 can include a modem 758, or is connected to a communications server on the WAN 754, or has other means for establishing communications over the WAN 754, such as by way of the Internet. The modem 758, which can be internal or external and a wired or wireless device, is connected to the system bus 708 through the serial port interface 742. In a networked environment, program modules depicted relative to the computer 702, or portions thereof, can be stored in the remote memory/storage device 750. It will be appreciated that the network connections shown are exemplary and other means of establishing a communications link between the computers can be used.

The computer 702 is operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This includes at least Wi-Fi and Bluetooth™ wireless technologies. Thus, the communication can be a predefined structure as with a conventional network or simply an ad hoc communication between at least two devices.

Wi-Fi, or Wireless Fidelity, allows connection to the Internet from home, in a hotel room, or at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 802.11 (a, b, g, etc.) to provide secure, reliable, fast wireless connectivity. A Wi-Fi network can be used to connect computers to each other, to the Internet, and to wired networks (which use IEEE 802.3 or Ethernet). Wi-Fi networks operate in the unlicensed 2.4 and 5 GHz radio bands, at an 11 Mbps (802.11a) or 54 Mbps (802.11b) data rate, for example, or with products that contain both bands (dual band), so the networks can provide real-world performance similar to the basic 10BaseT wired Ethernet networks used in many offices.

Figure 8:
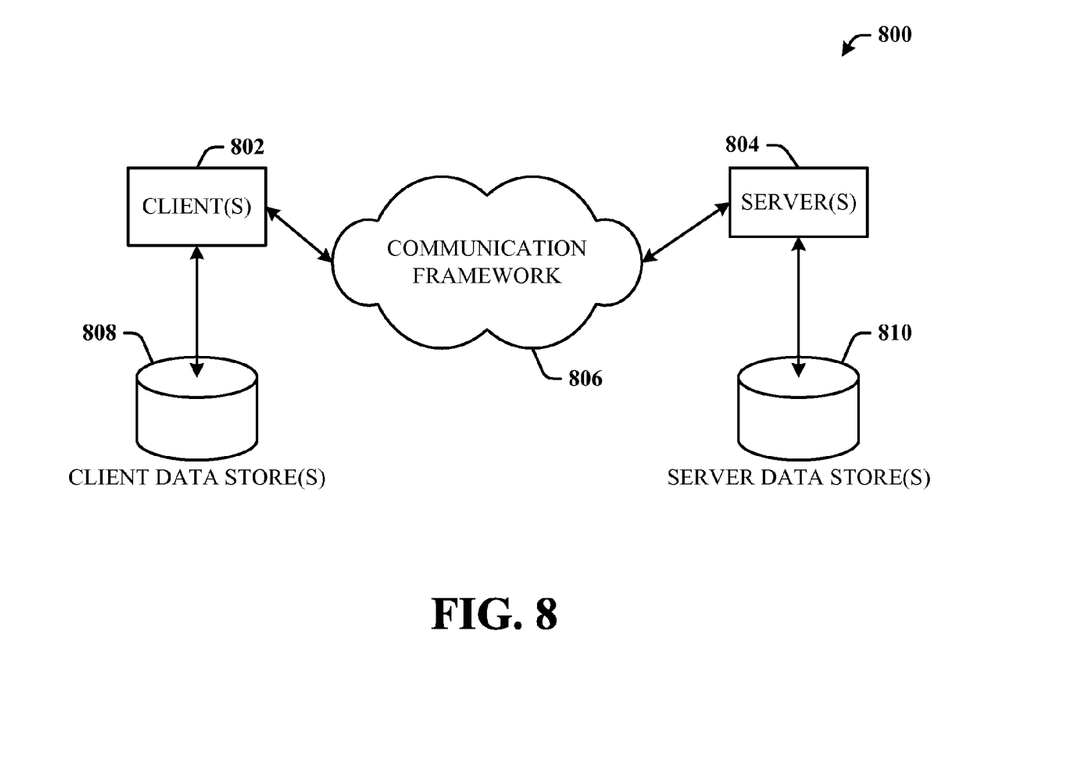
FIG. 8 illustrates a schematic block diagram of an exemplary computing environment operable to execute the disclosed aspects.

Referring now to FIG. 8, there is illustrated a schematic block diagram of an exemplary computing environment 800 in accordance with the various aspects. The system 800 includes one or more client(s) 802. The client(s) 802 can be hardware and/or software (e.g., threads, processes, computing devices). The client(s) 802 can house cookie(s) and/or associated contextual information by employing the various aspects, for example.

The system 800 also includes one or more server(s) 804. The server(s) 804 can also be hardware and/or software (e.g., threads, processes, computing devices). The servers 804 can house threads to perform transformations by employing the various aspects, for example. One possible communication between a client 802 and a server 804 can be in the form of a data packet adapted to be transmitted between two or more computer processes. The data packet may include a cookie and/or associated contextual information, for example. The system 800 includes a communication framework 806 (e.g., a global communication network such as the Internet) that can be employed to facilitate communications between the client(s) 802 and the server(s) 804.

Communications can be facilitated through a wired (including optical fiber) and/or wireless technology. The client(s) 802 are operatively connected to one or more client data store(s) 808 that can be employed to store information local to the client(s) 802 (e.g., cookie(s) and/or associated contextual information). Similarly, the server(s) 804 are operatively connected to one or more server data store(s) 810 that can be employed to store information local to the servers 804.

What has been described above includes examples of the various aspects. It is, of course, not possible to describe every conceivable combination of components or methodologies for purposes of describing the various aspects, but one of ordinary skill in the art may recognize that many further combinations and permutations are possible. Accordingly, the subject specification intended to embrace all such alterations, modifications, and variations.

In particular and in regard to the various functions performed by the above described components, devices, circuits, systems and the like, the terms (including a reference to a "means") used to describe such components are intended to correspond, unless otherwise indicated, to any component which performs the specified function of the described component (e.g., a functional equivalent), even though not structurally equivalent to the disclosed structure, which performs the function in the herein illustrated exemplary aspects. In this regard, it will also be recognized that the various aspects include a system as well as a computer-readable medium having computer-executable instructions for performing the acts and/or events of the various methods.

In addition, while a particular feature may have been disclosed with respect to only one of several implementations, such feature may be combined with one or more other features of the other implementations as may be desired and advantageous for any given or particular application. To the extent that the terms "includes," and "including" and variants thereof are used in either the detailed description or the claims, these terms are intended to be inclusive in a manner similar to the term "comprising." The term "or" as used in either the detailed description of the claims is meant to be a "non-exclusive or".

The word "exemplary" as used herein to mean serving as an example, instance, or illustration. Any aspect or design described herein as "exemplary" is not necessarily to be construed as preferred or advantageous over other aspects or designs.

Furthermore, the one or more aspects may be implemented as a method, apparatus, or article of manufacture using standard programming and/or engineering techniques to produce software, firmware, hardware, or any combination thereof to control a computer to implement the disclosed aspects. The term "article of manufacture" (or alternatively, "computer program product") as used herein is intended to encompass a computer program accessible from any computer-readable device, carrier, or media. For example, computer readable media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick). Additionally it should be appreciated that a carrier wave can be employed to carry computer-readable electronic data such as those used in transmitting and receiving electronic mail or in accessing a network such as the Internet or a local area network (LAN). Of course, those skilled in the art will recognize many modifications may be made to this configuration without departing from the scope of the disclosed aspects.

What is claimed is:

1. A system comprising:
    a processor coupled to computer-readable storage media containing instructions executable by the processor for implementing an activity component that monitors one or more communications of one or more users of a common workspace in a first shared database; and
    a correspond component implemented by the processor that labels a particular communication of the one or more communications monitored by the activity component by applying a first key tag to the particular communication when the particular communication is determined to be related to the common workspace in the first shared database, wherein the first key tag selectively associates the particular communication with the common workspace in the first shared database,
    wherein the correspond component reviews the particular communication for determining whether the particular communication is related to one or more other shared databases, wherein the correspond component applies one or more additional key tags associated with the one or more other shared databases to the particular communication when the particular communication is determined to be related to the one or more other shared databases, wherein the one or more additional key tags associate the particular communication with corresponding one or more other shared databases.

2. The system of claim 1, further comprising a tracking component that monitors communication information comprising at least one of a keyword, a phrase, a subject, or combinations thereof contained in the one or more communications for providing the communication information to the correspond component for use in determining one or more of the key tags to be applied to the one or more communications.

3. The system of claim 1, further comprising a restriction module that selectively allows review of the one or more communications maintained in the common workspace.

4. The system of claim 3, wherein the restriction module denies review of the one or more communications if a review request is received from an unauthorized user.

5. The system of claim 1, further comprising a restriction module that selectively allows modification to the one or more communications contained in the common workspace.

6. The system of claim 1, further comprising a search component that receives a request for information contained in the common workspace, the request includes a specific reference to the common workspace or a search term.

7. The system of claim 1, further comprising a feedback component that accepts a manual change to a mapping rule employed by the correspond component for relating the one or more communications to the one or more other shared databases.

8. The system of claim 1, wherein a plurality of users have access to a tagged communication labeled as being associated with the common workspace in the first shared database, and further comprising a monitor module that monitors which users of the plurality of users views the tagged communication and determines a particular time at which each user of the plurality of users reviewed the tagged communication associated with the common workspace.

9. The system of claim 8, wherein the monitor module provides a notification to an individual that is a source of the tagged communication when the tagged communication has been reviewed by one or more of the plurality of users.

10. The system of claim 1, further comprising a user interface that accepts information relating to a manual linking between the one or more communications and the common workspace.

11. The system of claim 1, further comprising a storage media that stores the one or more communications in a single location accessible by members of the shared workspace and members of the one or more other shared databases.

12. The system of claim 1, further comprising a first storage media on a first device of a first user of the common workspace that stores a first communication tagged as being associated with the common workspace, and a second storage media on a second device of a second user of the common workspace that stores a second communication tagged as being associated with the common workspace, such that content of the common workspace is maintained on two or more disparate devices and associated with the common workspace, wherein, when the content of the common workspace is reviewed, the content of the common workspace is dynamically obtained from the two or more disparate devices.

13. A method implemented by a processor executing instructions stored in computer-readable storage media, the method comprising:
   receiving, by the processor, work-activity information in one or more communications from one or more users of a plurality of users of a plurality of shared databases;
   associating, by the processor, the work-activity information with one or more of the shared databases, wherein the work-activity information is associated with the one or more shared databases based on content of the work-activity information or intended recipients of the work-activity information;
   applying the work activity-information to the one or more shared databases based on the association;
   monitoring which users of the plurality of users view the work-activity information applied to the one or more shared databases, wherein the users view the work-activity information by accessing content associated with at least one of the one or more shared databases;
   determining a particular time when each user of the plurality of users reviews the work-activity information contained in at least one of the plurality of shared databases; and
   notifying a contributor of the work-activity information when the one or more users change the work-activity information contained in the one or more shared databases.

14. The method of claim 13, wherein receiving the work-activity information comprises accepting a manual tagging of the work-activity information that indicates the work activity information is related to the one or more shared databases.

15. The method of claim 13, wherein the associating the work-activity information with one or more of the plurality of shared databases comprises automatically assigning an indicator to the work-activity information.

16. The method of claim 13, further comprising:
   receiving a request to view the work-activity information by receiving a request to view content of a particular one of the plurality of shared databases;
   determining if the request is authorized to view content of the particular shared database; and
   selectively displaying the work-activity information as part of the content of the particular shared database when the request is authorized.

17. The method of claim 16, wherein the selectively displaying the work-activity information comprises dynamically obtaining the work-activity information from storage media on two or more disparate devices.

18. The method of 16, wherein determining if the request is authorized comprises accessing a list of users allowed to view or modify the work-activity information of the particular shared database.

19. A computer-implemented method implemented by a processor executing instructions stored in computer-readable storage media, the method comprising:
   monitoring, by an activity component implemented by the processor, one or more communications of one or more users of a common workspace in a first shared database;
   labeling, by a correspond component implemented by the processor, a particular communication of the one or more communications monitored by the activity component by applying a first key tag to the particular communication when the particular communication is determined to be related to the common workspace in the first shared database, wherein the first key tag selectively associates the particular communication with the common workspace in the first shared database,
   reviewing, by the correspond component, the particular communication for determining whether the particular communication is related to one or more other shared databases, wherein the correspond component applies one or more additional key tags associated with the one or more other shared databases to the particular communication when the particular communication is determined to be related to the one or more other shared databases, wherein the one or more additional key tags associate the particular communication with corresponding one or more other shared databases.

* * * * *